US009719468B2

(12) United States Patent
Kakuk et al.

(10) Patent No.: US 9,719,468 B2
(45) Date of Patent: Aug. 1, 2017

(54) ENGINE FOR OUTDOOR POWER EQUIPMENT UNIT

(71) Applicant: THE TORO COMPANY, Bloomington, MN (US)

(72) Inventors: Jay J. Kakuk, Plymouth, MN (US); Trent R. Roth, Maple Grove, MN (US); Warren H. Daun, Eagan, MN (US); David J. Martin, Eden Prairie, MN (US); Philip C. Dretzka, Woodbury, MN (US)

(73) Assignee: THE TORO COMPANY, Bloomington, MN (US)

( * ) Notice: Subject to any disclaimer, the term of this patent is extended or adjusted under 35 U.S.C. 154(b) by 33 days.

(21) Appl. No.: 14/730,625

(22) Filed: Jun. 4, 2015

(65) Prior Publication Data
US 2015/0361932 A1 Dec. 17, 2015

Related U.S. Application Data

(60) Provisional application No. 62/010,633, filed on Jun. 11, 2014.

(51) Int. Cl.
*B01D 39/00* (2006.01)
*B01D 50/00* (2006.01)
(Continued)

(52) U.S. Cl.
CPC .... *F02M 35/0201* (2013.01); *F01M 11/0408* (2013.01); *F02B 75/00* (2013.01);
(Continued)

(58) Field of Classification Search
CPC ......... B01D 39/00; B01D 50/00; B01D 59/50
(Continued)

(56) References Cited

U.S. PATENT DOCUMENTS 4,403,466 A 9/1983 Tillotson et al.
5,228,536 A 7/1993 Mohns
(Continued)

FOREIGN PATENT DOCUMENTS

DE 36 10 421 A1 10/1987
DE 10 2008 063720 A1 6/2010
(Continued)

OTHER PUBLICATIONS

U.S. Appl. No. 62/010,633, filed Jun. 11, 2014, Kakuk et al.
(Continued)

*Primary Examiner* — Jacob T Minskey
*Assistant Examiner* — Minh-Chau Pham
(74) *Attorney, Agent, or Firm* — Mueting, Raasch & Gebhardt, P.A.

(57) ABSTRACT

An air cleaner system that potentially reduces debris entering a prime mover (e.g., engine) during removal/replacement of an air cleaner. In one embodiment, the engine includes a shroud defining an air cleaner compartment. The engine further includes a tubular air feed port defining a combustion air intake. The air feed port terminates at an end face located at or within the air cleaner compartment, and a lower portion of the end face is notched relative to other portions of the end face. In other embodiments, an engine oil drain system is provided that selectively positions a distal end of an oil drain tube at a drain position located away from the engine. The oil drain tube may also be repositioned to a stored position, wherein the distal end of the drain tube attaches to a nipple connected to either an engine housing or surrounding structure.

24 Claims, 15 Drawing Sheets

(51) Int. Cl.

| | |
|---|---|
| *B01D 59/50* | (2006.01) |
| *F02M 35/02* | (2006.01) |
| *F02M 35/024* | (2006.01) |
| *F02M 35/04* | (2006.01) |
| *F02B 75/00* | (2006.01) |
| *F01M 11/04* | (2006.01) |
| *B01D 46/24* | (2006.01) |

(52) U.S. Cl.
CPC ...... *F02M 35/0203* (2013.01); *F02M 35/024* (2013.01); *F02M 35/0209* (2013.01); *F02M 35/02416* (2013.01); *F02M 35/02475* (2013.01); *F02M 35/04* (2013.01); *B01D 46/2411* (2013.01); *B01D 2275/208* (2013.01); *F01M 2011/0425* (2013.01)

(58) Field of Classification Search
USPC ............. 55/495, 493, 385.3, 315; 123/198 E
See application file for complete search history.

(56) References Cited

U.S. PATENT DOCUMENTS

| | | | |
|---|---|---|---|
| 5,231,956 A | 8/1993 | Lux et al. | |
| 5,233,946 A | 8/1993 | Yamami | |
| 5,363,815 A | 11/1994 | Pretzsch et al. | |
| 5,908,337 A * | 6/1999 | Mashiko | F02B 61/045 440/88 A |
| 5,975,157 A | 11/1999 | Ashford | |
| 6,006,703 A | 12/1999 | Nakamura et al. | |
| 6,145,623 A | 11/2000 | Cordes | |
| 6,314,922 B1 | 11/2001 | Zimmermann et al. | |
| 6,523,508 B2 | 2/2003 | Hüsges et al. | |
| 6,761,136 B2 | 7/2004 | Ohsawa | |
| 6,889,635 B2 | 5/2005 | Geisheker et al. | |
| 6,948,457 B2 | 9/2005 | Maier et al. | |
| 7,361,201 B2 * | 4/2008 | Nakagome | B01D 46/008 123/184.31 |
| 7,363,885 B2 | 4/2008 | Miyake et al. | |
| 7,594,484 B2 | 9/2009 | Lavender et al. | |
| 7,753,980 B2 * | 7/2010 | Kobayashi | F02M 35/0203 55/315 |
| 8,277,528 B2 * | 10/2012 | Umemoto | A01D 34/82 55/385.3 |
| 8,394,158 B2 * | 3/2013 | Shimomura | F02M 35/0203 55/385.3 |
| 8,517,146 B2 | 8/2013 | Drew et al. | |
| 8,617,279 B2 * | 12/2013 | Schlesinger | F02M 35/02 123/198 E |
| 8,683,973 B2 | 4/2014 | Raasch | |
| 8,752,533 B2 | 6/2014 | Schultz | |
| 9,103,303 B2 | 8/2015 | Schultz | |
| 2005/0086918 A1 | 4/2005 | Honisch et al. | |
| 2005/0133305 A1 | 6/2005 | Okada et al. | |
| 2009/0307890 A1 | 12/2009 | Tamamoto et al. | |
| 2014/0237960 A1 | 8/2014 | Schultz | |
| 2015/0337778 A1 * | 11/2015 | Wagner | B01D 46/0047 55/385.3 |
| 2015/0345438 A1 * | 12/2015 | Finn | F02M 35/02416 55/480 |

FOREIGN PATENT DOCUMENTS

| | | |
|---|---|---|
| FR | 2 554 164 A3 | 5/1985 |
| WO | WO 2013/129998 A1 | 9/2013 |
| WO | WO 2015/191357 A2 | 12/2015 |

OTHER PUBLICATIONS

"Drainzit Oil Drain Hoses" Web page [online]. Drainzit, [retrieved on Apr. 5, 2016]. Retrieved from the Internet: <URL: http://www.drainzit.com/>. Copyright 2013; 2 pages.
"GREENbar Series High-Performance, Low-Permeation Small-Engine Fuel Hoses," Information sheet. Avon Automotive. Available at least as early as May 8, 2014; 2 pages.
International Patent Application No. PCT/US2015/034156, filed Jun. 4, 2015; International Search Report and Written Opinion. Issued Mar. 17, 2016; 17 pages.
International Patent Application No. PCT/US2015/034156, filed Jun. 4, 2015; Invitation to Pay Additional Fees and, Where Applicable, Protest Fee. Issued Dec. 14, 2015; 8 pages.
Briggs & Stratton, "Operator's Manual for Model 100000: 650 Exi; 675 Exi; and 725 Exi." Form 80011926USCN, Revision—. Briggs & Stratton Corporation, Milwaukee, WI, USA. Date Unknown; 32 pages.
Briggs & Stratton, "Operator's Manual for Models: 400000 Intek Professional Series; 440000 Intek Professional Series; and 490000 Professional Series." Form No. 80006739EST, Revision—. Briggs & Stratton Corporation, Milwaukee, WI, USA. Date Unknown; 136 pages.
IDS Document 5 "Briggs & Stratton EXI 725, Revised Design." Engine believed available on or before Nov. 19, 2014; 1 page.
IDS Document 4 "Briggs & Stratton EXI 725." Engine believed available on or before May 8, 2014; 2 pages.
IDS Document 1 "Briggs & Stratton 22 HP Engine, 656cc." Engine believed available on or before May 8, 2014; 2 pages.
IDS Document 2 "Kawasaki 21.5 HP Engine, 726cc." Engine believed available on or before May 8, 2014; 2 pages.
Kawasaki Engines, "4-Stroke Air-Cooled V-Twin Gasoline Engine, Models FR651V, FR691V, and FR730V" Owner's Manual. Part No. 99920-2249-04. Copyright 2008; 38 pages.
Kohler, "Kohler Courage Models SV710-SV740 and Courage PRO Models SV810-SV840" Owner's Manual. Form 32 590 06, Rev. A. Copyright 2011; 8 pages.
IDS Document 3 "Kohler Courage 22 HP Engine, 725cc." Engine believed available on or before May 8, 2014; 2 pages.
International Preliminary Report on Patentability for International Patent Application No. PCT/US2015/034156; Report mailed Dec. 22, 2016; 10 pages.

* cited by examiner

ENGINE FOR OUTDOOR POWER EQUIPMENT UNIT

This application claims the benefit of U.S. Provisional Application No. 62/010,633, filed Jun. 11, 2014, which is incorporated herein by reference in its entirety.

Embodiments of the present disclosure relate generally to outdoor power equipment and, more particularly, to engines for use with such equipment.

BACKGROUND

Outdoor power equipment units such as lawn mowers and the like are known to include prime movers, e.g., internal combustion engines. These mowers and their associated engines may require periodic maintenance to ensure optimal performance.

For instance, induction of relatively clean air (e.g., into a carburetor of the engine) is beneficial to ensure efficient combustion. To provide this clean air, the engine typically includes a filtering element or air cleaner positioned in line with an air intake of the engine. The air cleaner is able to filter debris that would otherwise degrade engine performance and/or potentially damage engine components were it to pass into the carburetor.

Air cleaners are typically intended to be cleaned and/or replaced after some usage period. Unfortunately, removal/replacement of air cleaners in many engines presents drawbacks. For instance, air cleaners are often secured by a cover fastened to the engine. Some level of caution is needed to ensure that the cover and fastener(s) are not lost during air cleaner replacement. Further, care is needed to ensure that debris that may have gathered on or around the air cleaner does not fall into the carburetor air intake when the air cleaner is removed.

Most engine manufacturers also recommend changing of oil after a specified period of operation. Changing the oil often requires removing a drain plug from a drain on the engine and positioning a collection device (e.g., funnel or can) to collect the draining oil. Depending on the location of the drain, the process of reaching the drain with the collection device and/or collecting the used motor oil may result in spillage onto other parts of the mower and/or the ground. Furthermore, caution is needed to ensure that the drain plug is not lost.

SUMMARY

Embodiments described herein may provide an engine and power equipment unit incorporating the same. For example, in one embodiment, an internal combustion engine is provided that includes: a shroud defining an air cleaner compartment including a lower surface; and a door attached to the shroud, the door movable between a closed position enclosing the air cleaner compartment, and an open position providing access to the air cleaner compartment. A tubular air feed port defining a combustion air intake of the engine is also included, the air feed port terminating at an end face located at or within the air cleaner compartment, wherein a lower portion of the end face is notched relative to other portions of the end face. An air cleaner cartridge is adapted to be received within the air cleaner compartment, the air cleaner cartridge including an exterior surface and an interior surface, the interior surface defined by an aperture extending through at least one wall of the air cleaner cartridge, the aperture adapted to engage the air feed port when the air cleaner cartridge is positioned in the air cleaner compartment in an installed position. One or more aspects may be additionally included, in any combination, to produce additional embodiments. For example, in one aspect, the lower surface may be tilted or otherwise declined from horizontal toward an air exit opening. In another aspect, a lowermost portion of the air cleaner cartridge may be spaced-apart from the lower surface of the air cleaner compartment when the air cleaner cartridge is in the installed position. In yet another aspect, the air cleaner cartridge may have a cross section that is obround in shape. In still another aspect, a fixed retention surface may be formed within the air cleaner compartment, wherein the retention surface could be adapted to abut the air cleaner cartridge when the air feed port is fully engaged with the aperture. In another aspect, one or both of the door and the air cleaner cartridge may include a portion that is adapted to interfere with the door reaching the closed position, when the air cleaner cartridge is in the air cleaner compartment, unless the air cleaner cartridge is in the installed position. In still yet another aspect, the aperture may engage the air feed port with an interference fit when the air cleaner cartridge is in the installed position. In another aspect, an axis of the air feed port may decline at an angle of 45 degrees or less from horizontal. In yet another aspect, the axis of the air feed port may be parallel to a plane containing the lower surface of the air cleaner compartment. In still another aspect, the shroud may define an air feed opening in communication with the air cleaner compartment, the air feed opening adapted to introduce air into the air cleaner compartment. A portion of the air introduced into the air cleaner compartment may pass over the lower surface and exit the air cleaner compartment through an air exit opening adjacent the lower surface.

In another embodiment, an internal combustion engine is provided that includes: a shroud defining an air cleaner compartment including a lower surface; and a door pivotally attached to the shroud, the door pivotable between a closed position enclosing the air cleaner compartment, and an open position providing access to the air cleaner compartment. Two air feed ports each defining an air intake adapted to deliver combustion air to a carburetor of the engine are also provided, the air feed ports each terminating at an end face positioned in communication with the air cleaner compartment, wherein a lower portion of each end face is recessed relative to other portions of the respective end face. An air cleaner cartridge is adapted to be received within the air cleaner compartment. The air cleaner cartridge may include an exterior surface and interior surfaces, the interior surfaces defined by apertures extending through at least one wall of the air cleaner cartridge, the apertures adapted to engage the respective air feed ports when the air cleaner cartridge is positioned in the air cleaner compartment in an installed position. One or more aspects may be additionally included, in any combination, to produce additional embodiments. For example, in one aspect, a retention surface may be formed in the air cleaner compartment, the retention surface adapted to engage a portion of the air cleaner cartridge only when the air feed ports are fully engaged with the respective apertures. In another aspect, the air cleaner cartridge comprises an endcap defining an external, recessed area. In still another aspect, one or more surfaces of the air cleaner compartment may define an air exit opening at or near the lower surface, the lower surface being tilted or otherwise declined toward the air exit opening. In yet another aspect, the one or more surfaces of the air cleaner compartment may also define an air feed opening, the air feed opening adapted to provide air flow into the air cleaner compartment. A portion of the air flow provided into the air cleaner compartment may exit the air cleaner compartment through the air exit opening. In still yet another aspect, the air cleaner cartridge defines a cross section that is obround in shape, the air cleaner cartridge bounded by a first and second endcap, wherein the apertures are formed in the first endcap. In yet another aspect, the lower surface of the air cleaner compartment may be spaced-apart from a lowermost portion of the air cleaner cartridge when the air cleaner cartridge is in the installed position. In another aspect, at least one of the air feed ports defines an axis, and wherein the axis is parallel to a plane containing the lower surface of the air cleaner compartment. In still yet another aspect, one or both of the door and the air cleaner cartridge include a portion that is adapted to interfere with the door reaching the closed position when the air cleaner cartridge is in the air cleaner compartment, unless the air cleaner cartridge is in the installed position.

In yet another embodiment, an internal combustion engine is provided that includes a shroud defining an air cleaner compartment including a lower surface. The air cleaner compartment includes an air feed opening and an air exit opening, the air exit opening located at or near the lower surface. The engine also includes a door attached to the shroud, the door movable between a closed position enclosing the air cleaner compartment, and an open position providing access to the air cleaner compartment. A tubular air feed port defining a combustion air intake of the engine is also provided, the air feed port terminating at an end face located at or within the air cleaner compartment. An air cleaner cartridge is adapted to be received within the air cleaner compartment, the cartridge including an exterior surface and an interior surface, the interior surface defined by an aperture extending through at least one wall of the air cleaner cartridge, the aperture adapted to engage the air feed port when the air cleaner cartridge is positioned in the air cleaner compartment in an installed position. One or more aspects may be additionally included, in any combination, to produce additional embodiments. For example, in one aspect, the air exit opening may be adapted to exhaust air in excess of that needed for combustion from the air cleaner compartment. In another aspect, the engine may further include a fan adapted to introduce air into the air cleaner compartment via the air feed opening. In still another aspect, the air feed opening may include two or more air feed openings.

In still another embodiment, a method of operating an internal combustion engine is provided, wherein the method includes: locating an air cleaner cartridge within an air cleaner compartment associated with the engine; providing a volume of air into the air cleaner compartment through an air feed opening; passing a first portion of the volume of air through the air cleaner cartridge for combustion by the engine; and exhausting a second portion of the volume of air through an air exit opening in the air cleaner compartment. One or more aspects may be additionally included, in any combination, to produce additional embodiments. For example, in one aspect, the method may further include entraining debris contained within the air cleaner compartment within the second portion of the volume of air before exhausting the second portion of the volume of air through the air exit opening. In another aspect, the method may further include passing the second portion of the volume of air over a lower surface of the air cleaner compartment before exhausting the second portion of the volume of air.

In still yet another embodiment, an internal combustion engine is provided that includes: an engine housing defining a reservoir adapted to hold a volume of oil, the engine housing attached to a structure; a nipple operatively connected to the engine housing or the structure; and an engine base defining an external drain port located at or near a lowermost elevation of the reservoir, wherein the external drain port is in fluid communication with the reservoir. A drain tube is also provided and includes a proximal end fixedly connected to the drain port, the drain tube movable between: a drain position, wherein a distal end of the drain tube is at or below the lowermost elevation of the reservoir; and a stored position. When the drain tube is in the stored position, the distal end of the drain tube is positioned such that the nipple is received therein. One or more aspects may be additionally included, in any combination, to produce additional embodiments. For example, in one aspect, a retention member may be affixed to the engine housing or the structure, the retention member adapted to assist in retaining the drain tube in the stored position. The retention member may be located between the proximal and distal ends of the drain tube when the drain tube is in the stored position. In another aspect, the distal end of the drain tube may be adapted to receive the nipple with an interference fit. In yet another aspect, the drain tube may include an enlarged diameter portion spaced-apart from the distal end of the drain tube, the enlarged diameter portion including a contact surface adapted to rest against an abutment surface of the retention member when the drain tube is in the stored position. The enlarged diameter portion may, in one configuration, include a crimp ring attached to the drain tube. In still another aspect, the drain tube is oriented vertically when in the stored position. In yet still another aspect, the nipple may be located at an elevation that is above an elevation of the volume of oil. In still another aspect, the drain tube may be resiliently deflected as it moves from the drain position to the stored position.

In another embodiment, an internal combustion engine is provided that includes an engine housing supported by vehicle structure. The engine housing forms a reservoir adapted to hold a volume of oil and defines an external drain port located at or near a lowermost elevation of the reservoir, wherein the external drain port is in fluid communication with the reservoir. A nipple is provided and operatively connected to the engine housing or the structure. A flexible drain tube including a proximal end is fixedly connected to the drain port. The drain tube is movable between: a drain position, wherein a distal end of the drain tube is at or below the drain port; and a stored position, wherein a portion of the drain tube is oriented vertically. The distal end of the drain tube receives the nipple when the drain tube is in the stored position. One or more aspects may be additionally included, in any combination, to produce additional embodiments. For example, in one aspect, the engine housing may further include a retention member adapted to assist in retaining the drain tube in the stored position. The retention member may be spaced-apart from the nipple.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
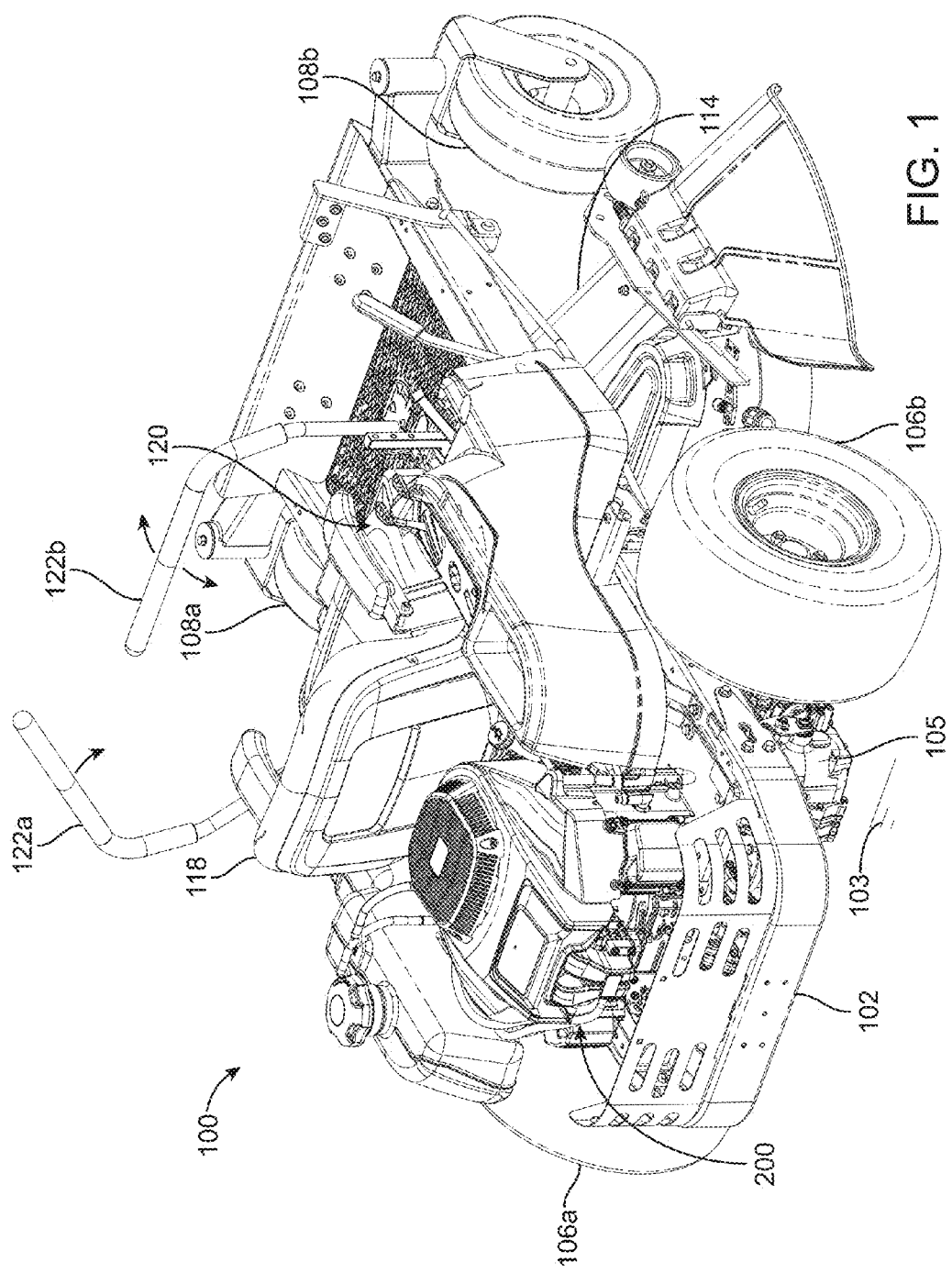
FIG. 1 is a right rear perspective view of an exemplary outdoor power equipment unit (e.g., a zero-turning-radius power lawn mower) incorporating a prime mover (e.g., internal combustion engine) in accordance with one embodiment of the disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are understood as being modified in all instances by the term "about." Thus, unless otherwise indicated, numerical parameters set forth in the specification and claims are approximations that may vary depending upon the desired properties sought to be obtained. At the very least, and not as an attempt to limit the doctrine of equivalents to the scope of the claims, each numerical parameter should at least be construed in light of the number of reported significant digits and by applying ordinary rounding techniques.

FIG. 1 shows a prime mover, e.g., internal combustion engine 200, in accordance with one embodiment of the disclosure as it may be incorporated on a power equipment unit or vehicle, e.g., a rear-engine zero-turning-radius (ZTR) riding power lawn mower 100. While, for the sake of brevity, embodiments are herein described with respect to such a mower (hereinafter generically referred to merely as a "mower" or "vehicle"), those of skill in the art will realize that various embodiments of the engine may also find application to other types of walk-behind and riding mowers, as well as to most any other grounds maintenance vehicle or power equipment unit, e.g., skid-steer loader, aerator, snow thrower, tiller, trencher, horizontal directional drill, etc. Moreover, while illustrated herein in the context of an internal combustion engine, such a configuration is not limiting. In fact, the prime mover may be most any power source now known or later developed that may benefit from concepts similar to those described and/or illustrated herein. For convenience and without limitation, the prime mover is described herein as an internal combustion engine.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100/engine 200 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While the general construction of the mower 100 is not necessarily central to an understanding of exemplary embodiments (e.g., other mower and other vehicle configurations are certainly contemplated), the general construction of the mower 100 is briefly described below.

FIG. 1 illustrates the mower 100 having a chassis 102 supporting a prime mover, which again, in the illustrated embodiment, may be configured as the internal combustion engine 200. A pair of transversely opposing, ground engaging drive members, e.g., first and second drive wheels 106 (106a and 106b), may be rotatably coupled to opposite (left and right) sides of the chassis to support and propel the mower 100 relative to the ground surface 103. Each drive wheel 106 may be powered by its own separate hydrostatic motor and pump or, alternatively, by one or more integrated hydrostatic transaxles (IHT) 105. Each IHT 105 may be attached to the chassis 102 and be powered by the engine 200, e.g., via a belt (not shown). While not illustrated, other drive systems, e.g., mechanical gear- or pulley-driven systems, may also be utilized. A pair of front swiveling caster wheels 108 (108a and 108b), which may be connected to forwardly extending rails of the chassis 102, may support the front of the mower 100 in rolling engagement with the ground surface 103.

Although the illustrated mower has the drive wheels 106 in the rear and caster wheels 108 in front, this configuration is not limiting. For example, other embodiments may reverse the location of the wheels, e.g., drive wheels in front and driven or undriven wheels in back, while other embodiments may replace the wheels with other drive members such as tracks. Still further, other configurations may use different wheel configurations altogether, e.g., a tri-wheel configuration or a vehicle using steered (e.g., Ackermann-style) front wheels. Accordingly, most any wheel/track configuration is contemplated.

A cutting deck 114 may be mounted to a lower side of the chassis 102, e.g., between the drive wheels 106 and the caster wheels 108. The cutting deck 114 may include one or more cutting blades (not shown) as are known in the art. The cutting blades may be operatively powered, via spindles connected to the deck, by the engine 200. During operation, power is selectively delivered to the cutting deck 114 (e.g., via a belt or other power transmission device), whereby the blades rotate at a speed sufficient to sever grass and other vegetation over which the cutting deck passes during operation.

As further illustrated in FIG. 1, the mower 100 may also include an operator control system 120. In the illustrated embodiment, the control system 120 includes operator controls that are mounted, relative to the chassis 102, such that the controls are located within comfortable reach of hands (or feet) of an operator located on an operator platform. In the illustrated embodiment, the operator platform includes a seat 118, but the platform could be most any device that supports the operator during vehicle operation, e.g., a standing platform, sulky, etc.

The system 120 may include, among other controls, a first control lever 122a and a second control lever 122b both pivotally attached to the chassis 102. The control levers 122 may each be configured to pivot about a generally transverse axis as is known in the art (e.g., between an intermediate neutral position and a full forward (and full reverse) position). As shown in FIG. 1, one or both of the control levers 122 (see, e.g., lever 122a) may also be pivotable outwardly (e.g., about an axis generally parallel to a longitudinal axis of the mower 100). Such a configuration may allow more convenient operator ingress to/egress from the seat 118. Pivotal inward movement of the control lever 122 by the operator (after sitting) may activate an operator presence switch (not shown). Activation of such a switch may be required before engagement of some of the mower subsystems.

Each control lever 122 may independently vary a velocity of its respective drive wheel 106 (e.g., via control of a swashplate in the IHT 105) incrementally between zero velocity (corresponding to the associated control lever being in the neutral position) and a second or maximum forward velocity (corresponding to the associated control lever being in the full forward position). Each control lever 122 may additionally be movable to a third (full reverse) position corresponding to a maximum reverse velocity of its associated drive wheel.

As FIG. 1 illustrates, the control system 120 may also include other features. For instance, a parking brake handle (e.g., to selectively activate a brake when the vehicle is parked), a deck height adjustment lever (e.g., to adjust the cutting height of the deck 114), a throttle lever (e.g., to control a speed of the engine 200), and a deck engagement mechanism (e.g., to initiate and terminate power delivery to the cutting blades of the mower deck 114) may also be provided.

Figure 2:
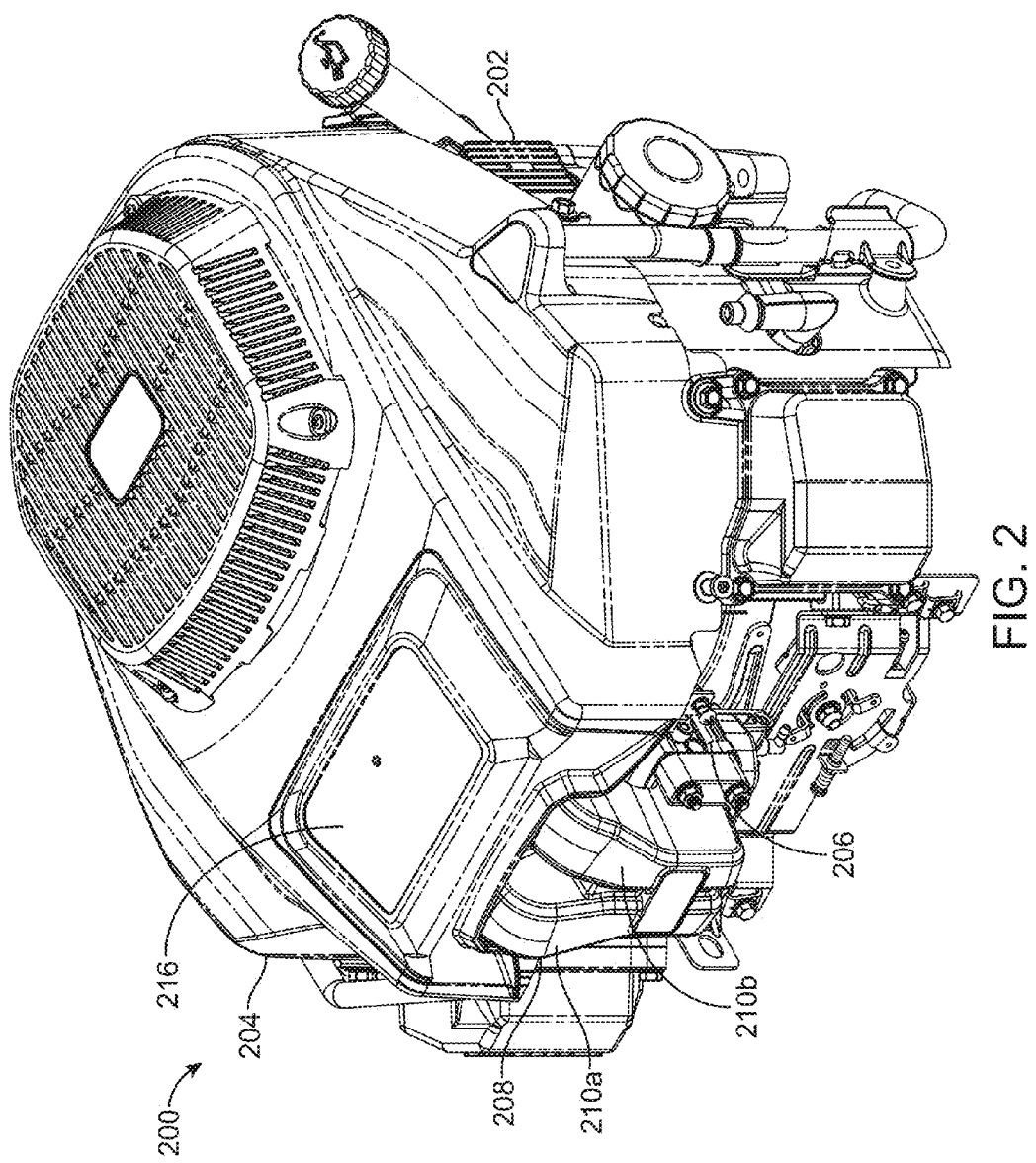
FIG. 2 is an enlarged perspective view the exemplary engine of FIG. 1 (with mower structure removed), the engine shown with an air cleaner door in a closed position.

With this brief introduction of the vehicle/mower 100, various exemplary embodiments of the engine 200 will now be described. FIG. 2 is an enlarged view of the engine 200 of FIG. 1 with mower structure (e.g., chassis, wheels, etc.) removed to better illustrate the engine itself. As shown in this view, the engine 200 may be a vertical shaft (e.g., having a crankshaft or output shaft 201 (see FIG. 3) oriented vertically), twin-cylinder (V-twin) engine. The exemplary engine 200 may further incorporate overhead valves and a conventional carburetor. Of course, such a configuration is exemplary only as many different engine configurations (single- (or other multi-) cylinder configuration, fuel injected, turbo-charged, horizontally-oriented output shaft, etc.) are contemplated.

Figure 3:
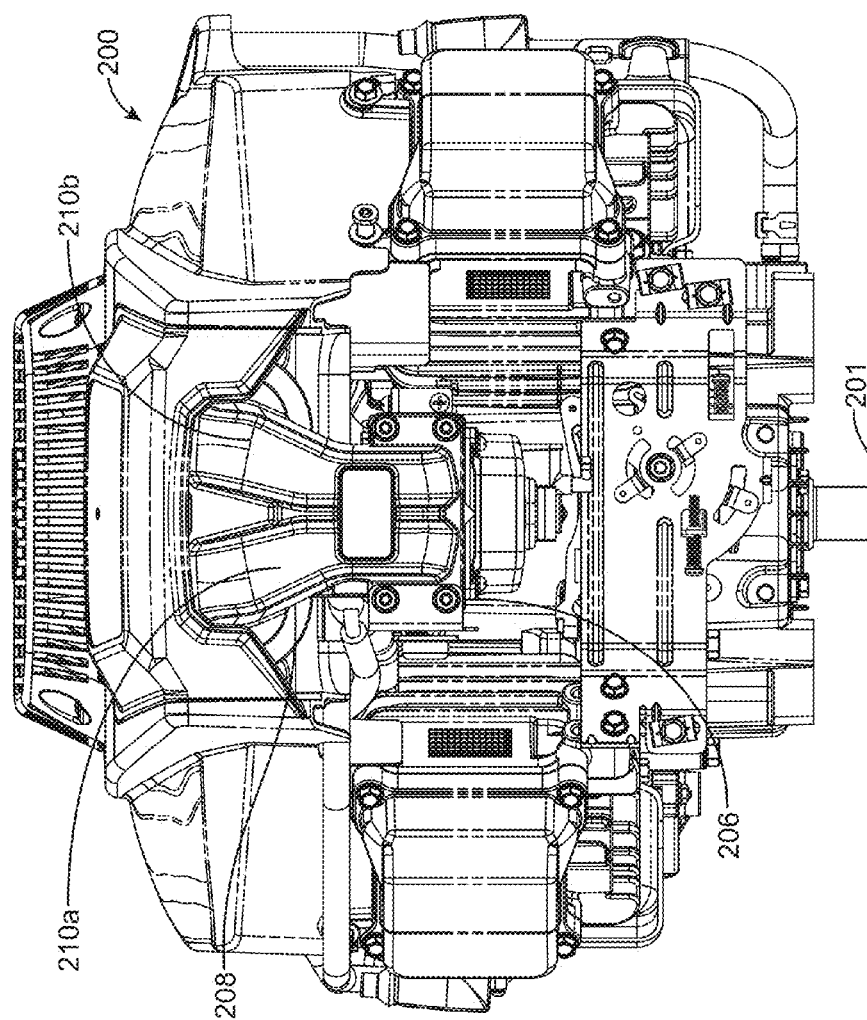
FIG. 3 is a rear elevation view of the exemplary engine of FIG. 2.

The engine 200 may form an engine housing that includes, among other components, a block 202 and a head, the latter partially covered by a shroud 204 as indicated in FIG. 2. As used herein, "shroud" may be a separate, e.g., plastic, component or cover attached to the block as shown in the figures or, alternatively, it may be an integral part of the engine (e.g., part of the engine head or block) itself. A carburetor 206 may be provided to combine combustion air with fuel and deliver the mixture to combustion chambers of each cylinder. To provide combustion air to the carburetor 206, an induction manifold 208 is provided as also shown in FIG. 3. In one embodiment, the induction manifold 208 may include two independent intakes 210 (210a and 210b), which are also referred to herein as merely intakes or combustion air intakes, that ultimately merge to form one passageway into the carburetor 206. Such a configuration may appear generally V-shaped when viewed directly head-on as shown in FIG. 3. Alternatively, each intake 210 could independently feed a separate barrel of a multi-barrel carburetor.

Figure 4:
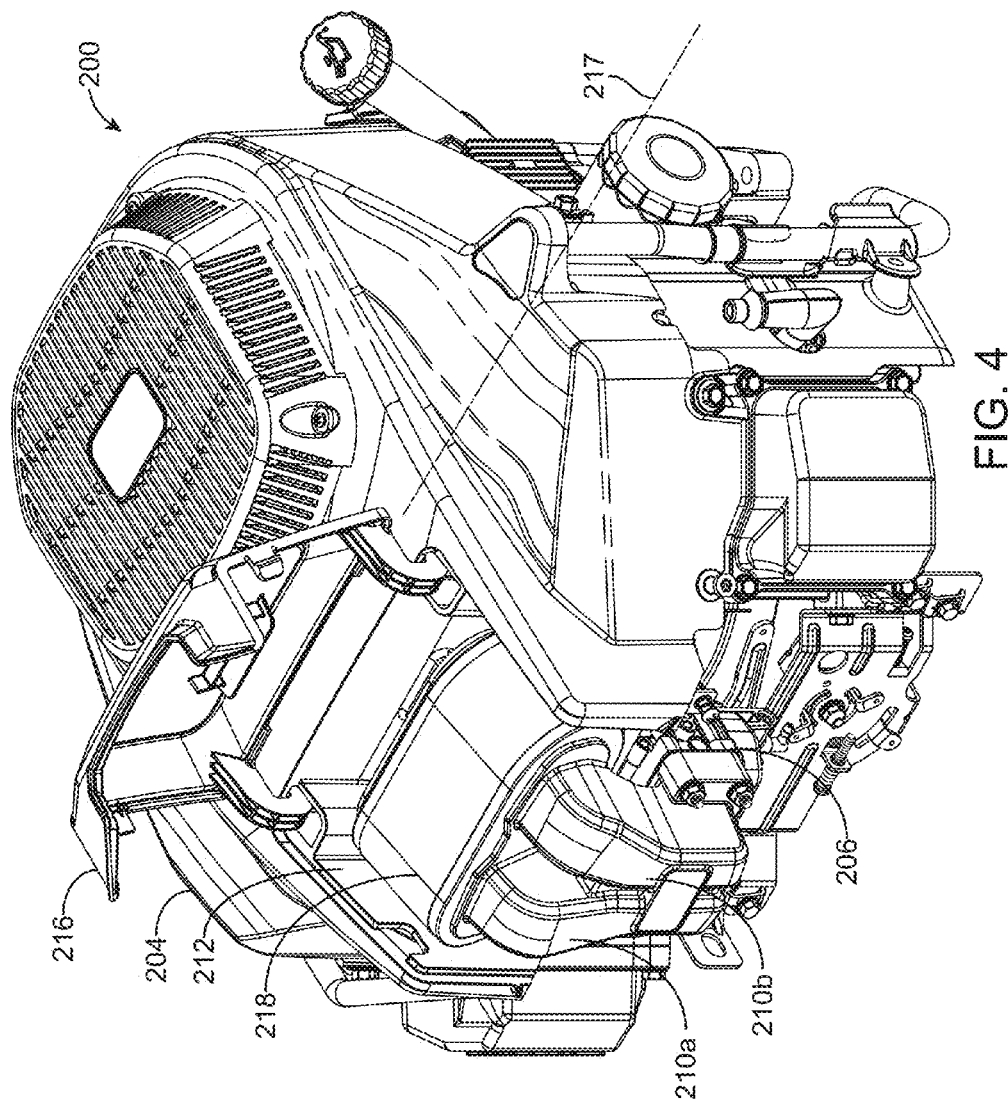
FIG. 4 is a view similar to FIG. 2, but with the air cleaner door shown open and an air cleaner cartridge in accordance with one embodiment shown in an installed position.

Each of the intakes 210 may extend into or otherwise communicate with an air cleaner compartment 212 defined by the shroud 204 as shown in FIG. 4. That is, each intake 210 of the engine may be defined by a tubular induction or air feed port 214 (see two ports 214a and 214b in FIG. 7) through which combustion air is drawn into (e.g., delivered to) the carburetor 206 of the engine. As shown in FIG. 4, the air cleaner compartment 212, which may include (among other surfaces) a lower surface 234 (see, e.g., FIG. 9), may be generally enclosed yet selectively accessible via an air cleaner door 216 attached to the shroud and movable between a closed position enclosing the air cleaner compartment as shown in FIG. 2, and an open position providing access to the air cleaner compartment as shown in FIG. 4. In the illustrated embodiment, the door 216 is hinged (e.g., pivotally attached) to the shroud 204 such that it may pivot about a horizontal, transverse axis 217 that is located forward of the compartment 212. As a result, the door 216 may pivot upwardly toward the front of the mower as it moves from the closed position of FIG. 2 to the open position of FIG. 4. The door and/or shroud may include detents, high friction hinges, or the like to hold the door in one or both of the closed and open positions. In other embodiments, a more positive securing mechanism, e.g., a deflectable latch, may be used to secure the door in at least one (e.g., the closed) position.

Figure 5:
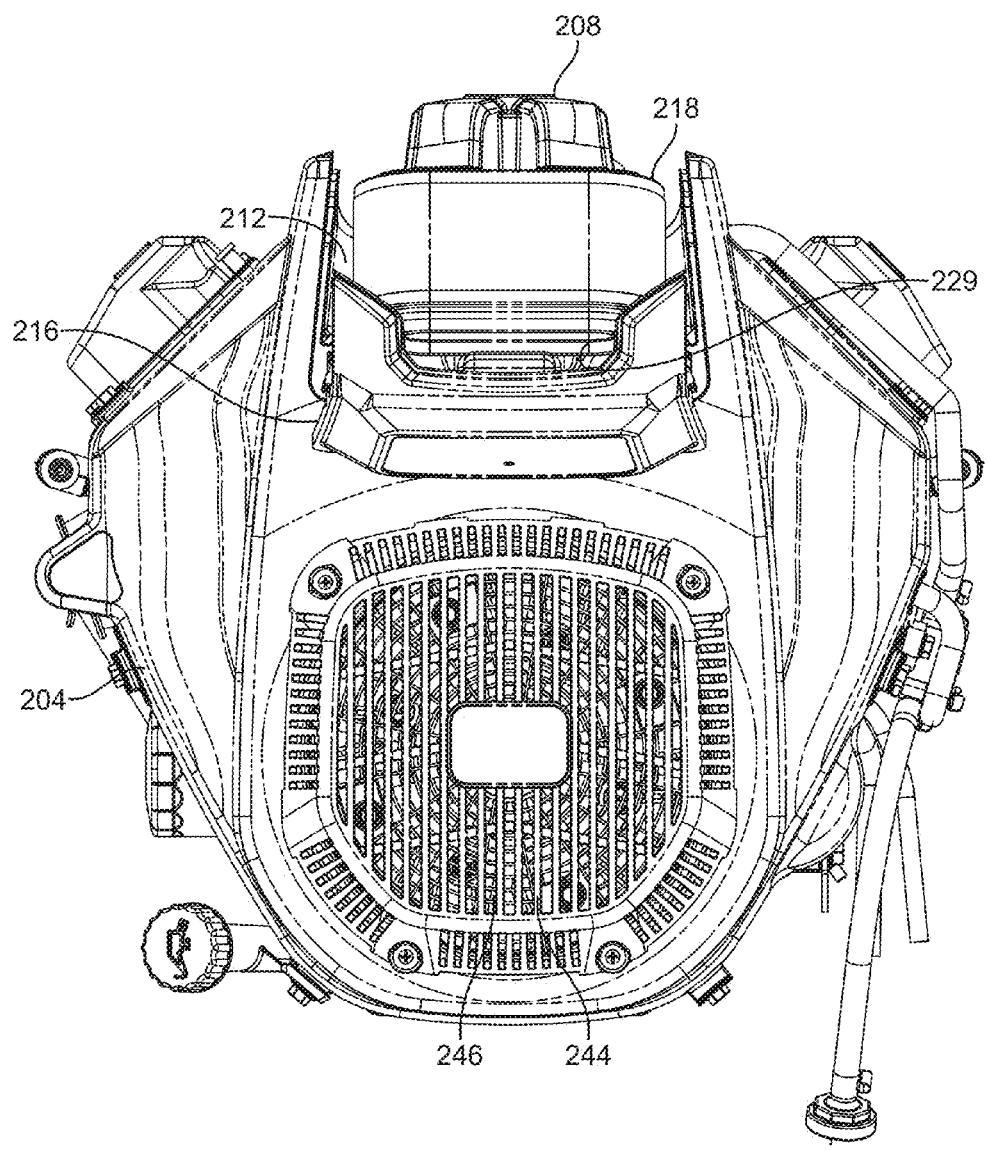
FIG. 5 is a top plan view of the engine of FIG. 4 (with the air cleaner door open and the air cleaner cartridge shown in the installed position)
Figure 6:
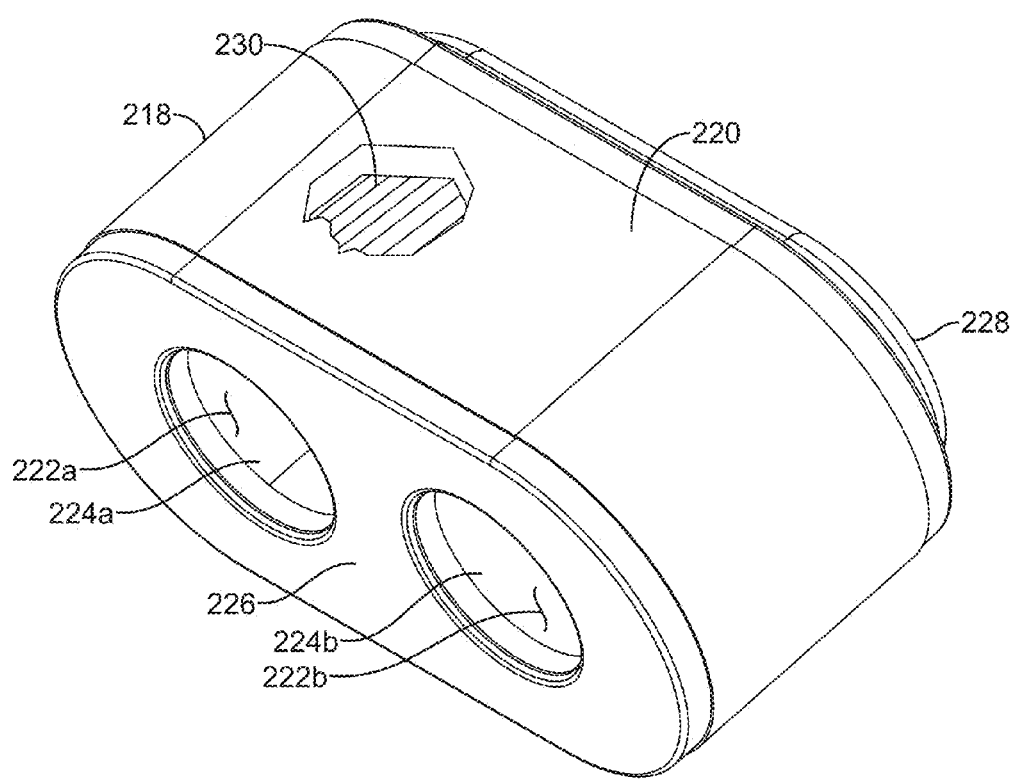
FIG. 6 is a perspective view of an air cleaner cartridge in accordance with one embodiment of the disclosure, wherein a portion of the air cleaner cartridge is shown cut-away.

As shown in FIGS. 4 and 5, the air cleaner compartment 212 is adapted to receive and retain therein an air cleaner cartridge 218 (also referred to herein as an "air filter"), an exemplary embodiment of which is shown in more detail in FIG. 6. In the illustrated embodiment, the air cleaner cartridge 218 has a cross section that is obround in shape, a cross section which is generally consistent over the depth of the cartridge (see FIG. 6). The cartridge 218 may include an exterior surface 220 and one or more interior surfaces 222 (e.g., 222a and 222b), the latter defined by (i.e., accessible through) one or more apertures 224 (224a, 224b) extending through at least a first (e.g., rear) wall or endcap 226 of the cartridge 218. The apertures 224 may form female receptacles adapted to engage (receive therein) the male air feed ports 214 (214a and 214b in FIG. 7) of the respective intakes 210 (210a and 210b in FIG. 7) when the air cleaner cartridge is positioned or otherwise disposed in the air cleaner compartment in an installed position (e.g., when the air feed port is fully engaged with the aperture as shown, for example, in FIG. 12). Alternatively, the aperture(s) 224 of the air cleaner cartridge 218 could be formed by protruding tubular (male) members that are then received within the passageway(s) formed by the ports 214.

In the illustrated embodiment, filter media 230 (see cutaway portion of FIG. 6) of the air cleaner cartridge 218 is located between the exterior filter surface 220 and the interior surface(s) 222 such that air reaching the air feed ports 214 first passes through the filter media 230. The filter media 230 may be supported by the first endcap 226 and a second (e.g., front) wall or endcap 228, both of which bound (form the front and rear boundaries of) the cartridge. In one embodiment, the filter media 230, which may be constructed of paper or the like, may extend completely around the air cleaner cartridge 218 such that air may enter the cartridge at most any location along the cartridge's circumference/periphery (along the exterior filter surface 220). In one embodiment, the air feed ports 214 may be received within the aperture(s) 224 with an interference fit (when the cartridge is in the installed position) to minimize air entering the feed ports 214 without first passing through the filter media 230.

As shown in the embodiment of FIG. 6, the first endcap 226 may define the two apertures 224, but is otherwise impermeable to air flow. That is, with the exception of the apertures 224, the first and second endcaps 226 and 228 may, in one embodiment, be mostly impermeable to airflow, e.g., be constructed of rubber or plastic. While illustrated with two apertures 224, other embodiments may utilize a single or, alternatively, three or more apertures. Where the feed ports/apertures are circular, multiple apertures (two or more) may assist in indexing the air cleaner cartridge during installation. However, a single feed port/aperture may be used when, for example, the port/aperture is of another shape and/or where indexing of the air cleaner cartridge is not needed.

While shown as having an endcap material that is mostly impermeable, such a construction is not limiting. Rather, the endcaps 226, 228 of the air cleaner cartridge 218 could be constructed in most any manner that prevents debris from entering into the intakes 210 without first passing through filter media. For example, in other embodiments, the endcaps 226, 228 could be constructed of, or be made of the same material as, the filter media 230. In such an embodiment, combustion air could also enter the air cleaner cartridge 218 through the endcaps 226, 228.

Figure 7:
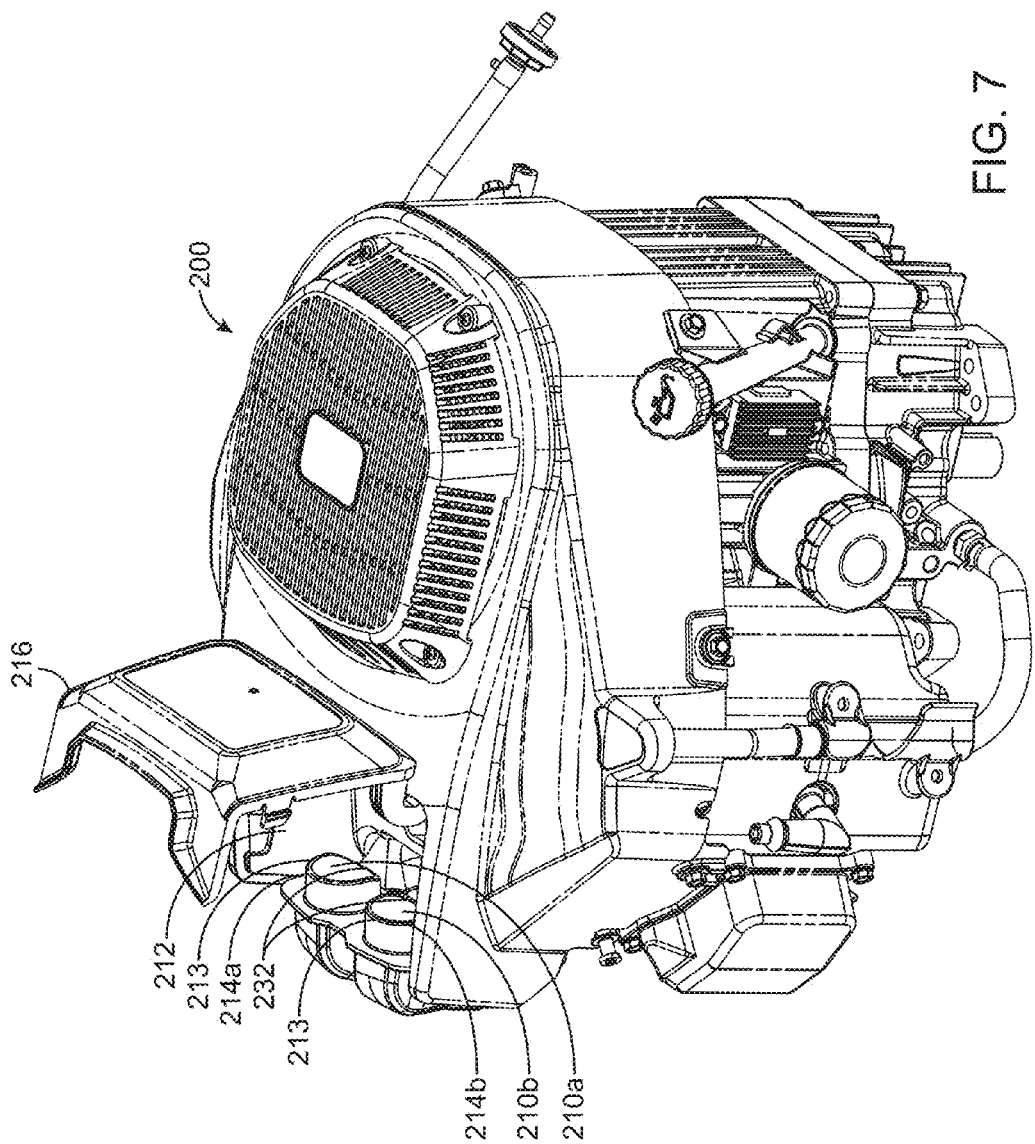
FIG. 7 is an alternative perspective view of the engine of FIG. 4 (with the air cleaner door open), but with the air cleaner cartridge removed.
Figure 8:
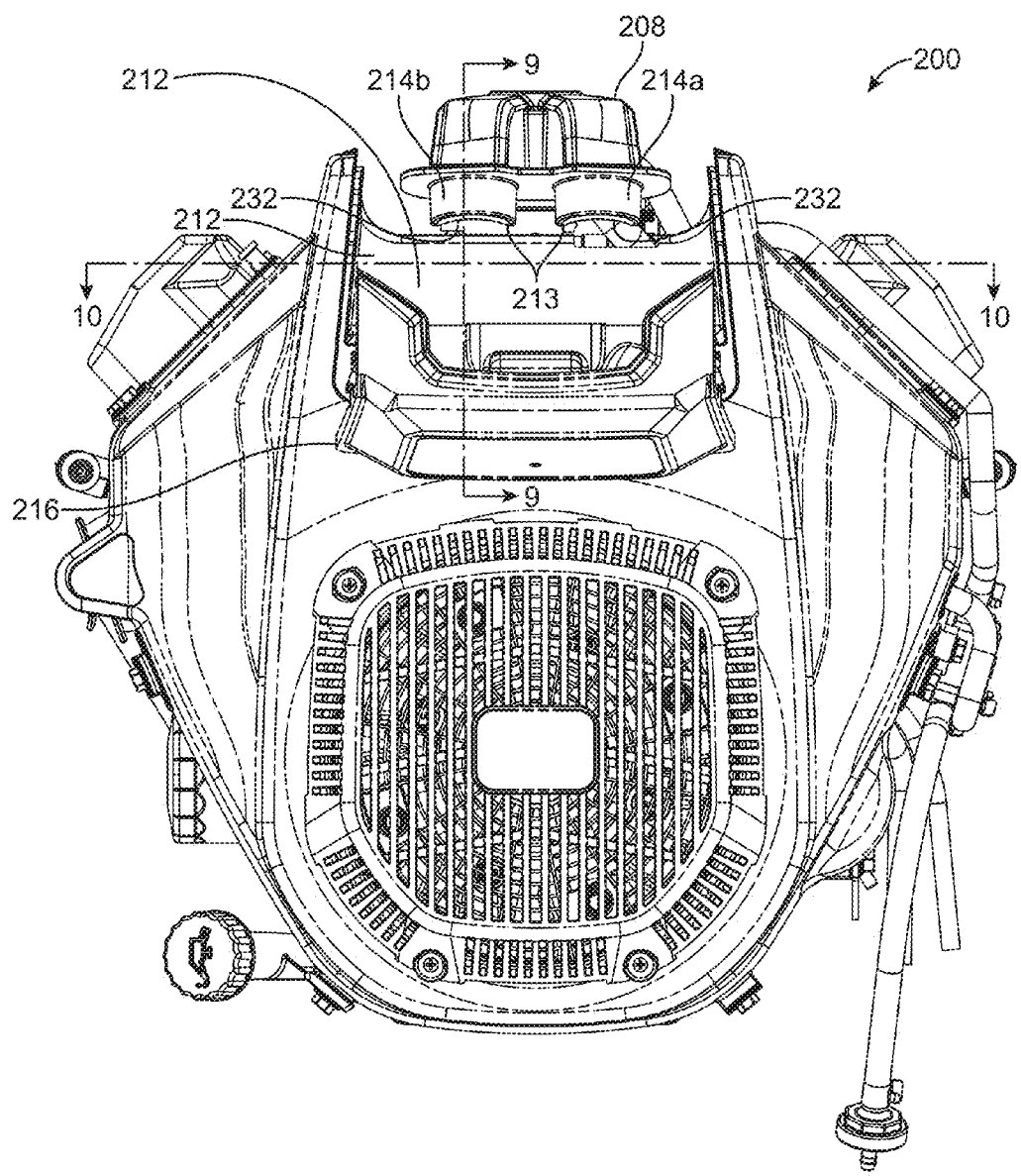
FIG. 8 is a top plan view of the engine of FIG. 7.

FIGS. 7 and 8 illustrates the air cleaner compartment 212 with the door 216 open and the air cleaner cartridge 218 removed. The air feed ports 214 (214a and 214b), as shown in this view, may each terminate at an end face 213 that is located at or within the air cleaner compartment 212 (or at least positioned in communication with the compartment). As further shown in these views, the end face 213 of each feed port 214 may have a lower portion 215 (see FIG. 9) that is notched (e.g., recessed or relieved) relative to other portions of the respective end face, e.g., each lower portion 215 may define a relieved or indented lower edge 232. In one embodiment, a lower edge of each air feed port 214 may include a concave cutout (e.g., a semi-circular or concave recess) formed therein such that the lowermost edge of each air feed port is offset (e.g., toward the rear of the mower 100) from the remaining edges of the air feed port. Such a construction may reduce the chances that debris could "fall in" to the intakes 210 during installation/removal of the air cleaner 218.

Figure 9:
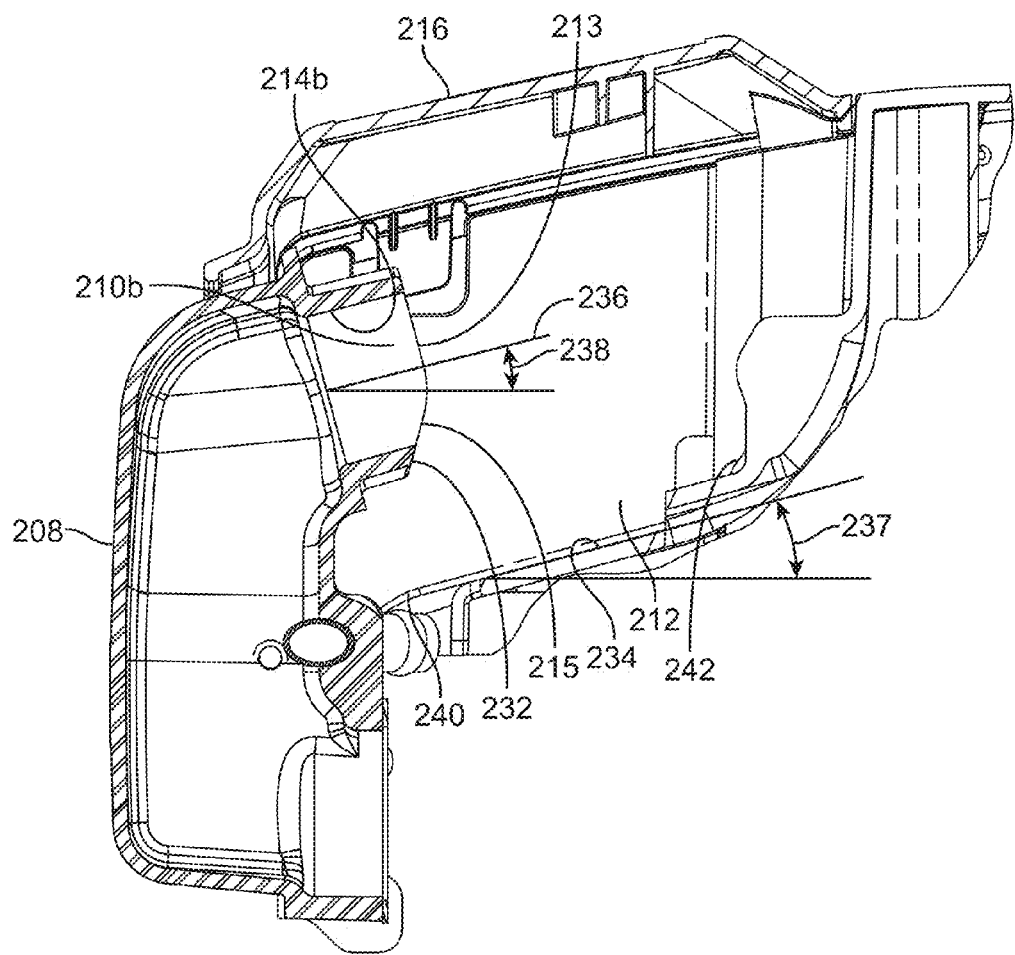
FIG. 9 is a partial section view taken along line 9-9 of FIG. 8, but with the air cleaner door closed and the air cleaner cartridge removed.

FIG. 9 is a section view taken through the feed port 214b along a vertical plane generally parallel to a longitudinal axis of the mower (e.g., along line 9-9 of FIG. 8). In this view, the door 216 is closed and the air cleaner cartridge 218 is removed. The relieved or notched lower edge 232 is also visible in this view.

FIG. 9 also illustrates the lower surface 234 of the air cleaner compartment 212. In one embodiment, the lower surface 234 may be generally planar and tilted or otherwise declined from horizontal at an angle 237 such that the lower surface tilts downwardly toward an air exit opening 240 (formed by one or more surfaces (e.g., located at or near the lower surface) of the compartment) to assist with removal of debris as further described below.

In one embodiment, each air feed port 214 (e.g., each intake 210) may define an axis 236 that is also tilting or declining rearwardly relative to horizontal (e.g., tilting toward the carburetor inlet), e.g., at an angle 238 from a horizontal plane. While not wishing to be bound to any specific angular requirement, the angle 238 may, in one embodiment, be 45 degrees or less from horizontal, e.g., 5-40 degrees. In one embodiment, the angle 238 may be such that the axis 236 is parallel to the lower surface 234 (e.g., is parallel to a plane containing the lower surface) as indicated in FIG. 9 (e.g., the angle 237 may be equal to the angle 238). While not illustrated, the axis 236 of each feed port 214 could also be angled (e.g., outwardly) from a longitudinal axis of the mower (e.g., when viewed from above as shown in FIG. 8).

By attaching the air cleaner cartridge 218 in a primarily horizontal direction (e.g., at the angle 238), the opportunity for debris to fall into the intakes 210 during cartridge removal/installation may be further reduced as compared with more vertical attachment concepts.

Moreover, by selecting the angle 237 such that the lower surface 234 is declined rearwardly as shown in FIG. 9, debris that enters the compartment 212 may fall to the lower surface 234 and, via gravity, move toward the air exit opening 240. In one embodiment, the air exit opening is formed through or adjacent the lower surface, e.g., at a rearmost or lowermost point along the lower surface. Debris evacuation via the air exit opening 240 may be assisted by excess combustion air entering the compartment 212 and exhausting through the opening 240. That is, during engine operation, a portion of the air that enters the compartment 212 does not flow through the cartridge 218 but may instead pass or wash over the lower surface 234, where it may gather debris collected thereon and exhaust the debris through the opening 240. In the illustrated embodiment, the location of the air exit opening 240 may be selected to ensure that the area beneath the opening is relatively free of engine components that may trap debris or that may be subject to high engine heat. Accordingly, at least in one embodiment, debris exiting the opening 240 may be quickly dispersed away from the engine 200.

Figure 10:
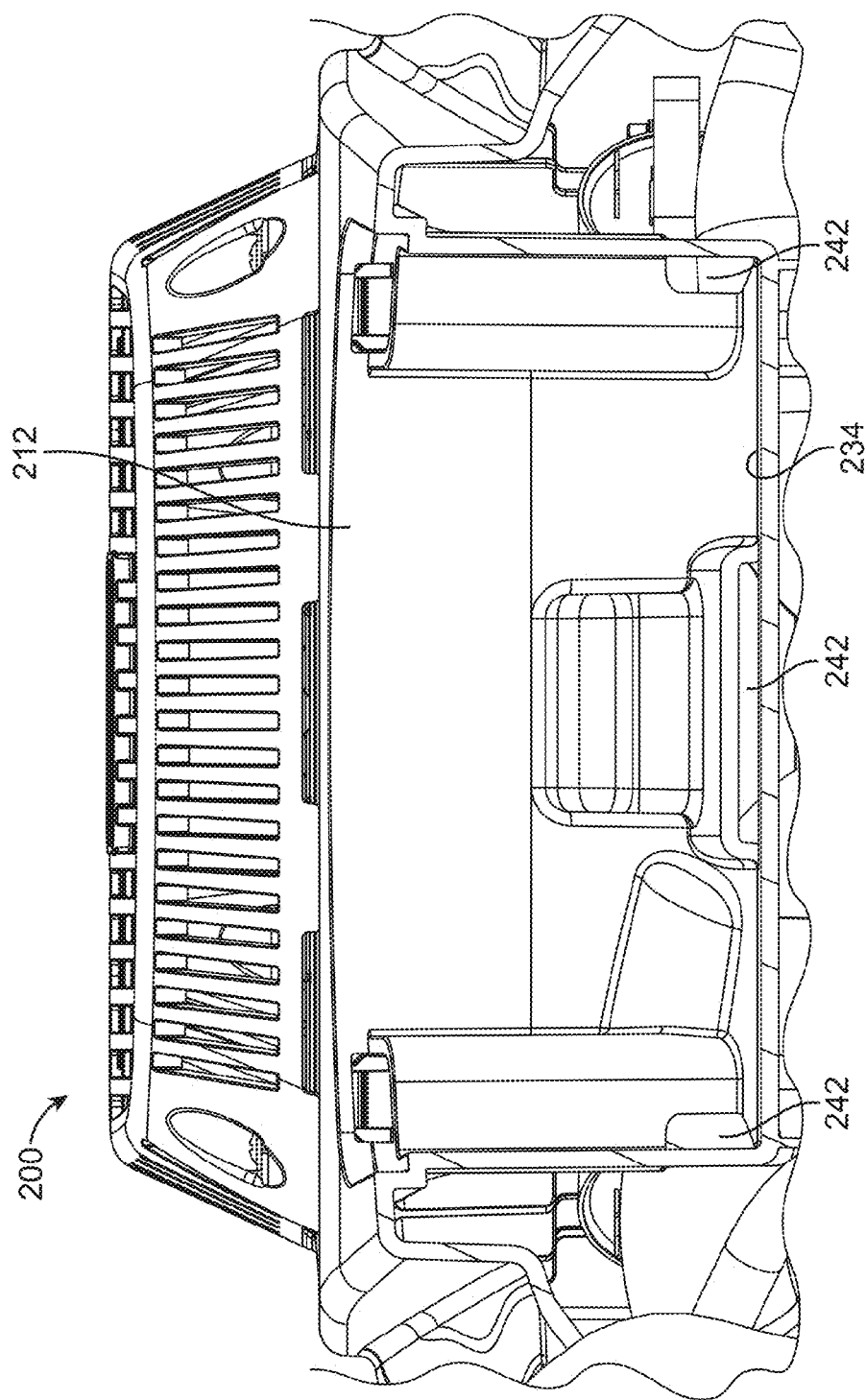
FIG. 10 is a partial section view taken along line 10-10 of FIG. 8.

FIG. 10 illustrates a section view of the compartment 212 taken along line 10-10 of FIG. 8 e.g., along a vertical plane generally normal to a longitudinal axis of the mower). As shown in this view, the shroud (e.g., surfaces of the compartment 212) may define one or more (e.g., three) air feed openings 242 near a forward portion of, and in communication with, the compartment. These air feed opening 242 may be adapted to introduce or otherwise provide a flow of air into the air cleaner compartment 212, some of which may pass through the air cleaner cartridge 218 as discussed herein for combustion. Air in excess of that required for combustion may exit the air cleaner compartment, potentially with debris entrained therein, through the air exit opening 240.

In one embodiment, air introduction into the compartment 212 is provided, or at least assisted by, the engine 200. For example, the engine may include a fan 244 (see FIG. 5) attached to an upper side of the crankshaft 201 (see FIG. 3) such that the fan rotates with the crankshaft as is known in the art. The fan 244 may include vanes designed to pull ambient air into the engine to cool the engine during operation, and to introduce air into the air cleaner compartment via one or more (e.g., two) air feed openings as described below. The air may be drawn into the engine through a grate 246 at the top of the engine as also shown in FIG. 5. The grate 246 provides a course filter to prevent larger debris from entering the engine.

While air drawn through the grate 246 may be used to cool the engine, some of this air may be diverted into the compartment 212 via the air feed openings 242 (see FIG. 10). Once again, the volume of air diverted may be selected to ensure that, at a minimum, sufficient combustion air enters through the air cleaner cartridge 218. As described above, additional air diverted to the compartment 212 via the air feed opening(s) 242 may be exhausted via the air exit opening(s) 240 (see FIG. 9) as described above. This "wash" air may continuously (while the engine is operating) flush the lower surface 234 (as well as the air cleaner cartridge 218) of debris that may enter into the compartment 212.

Figure 11:
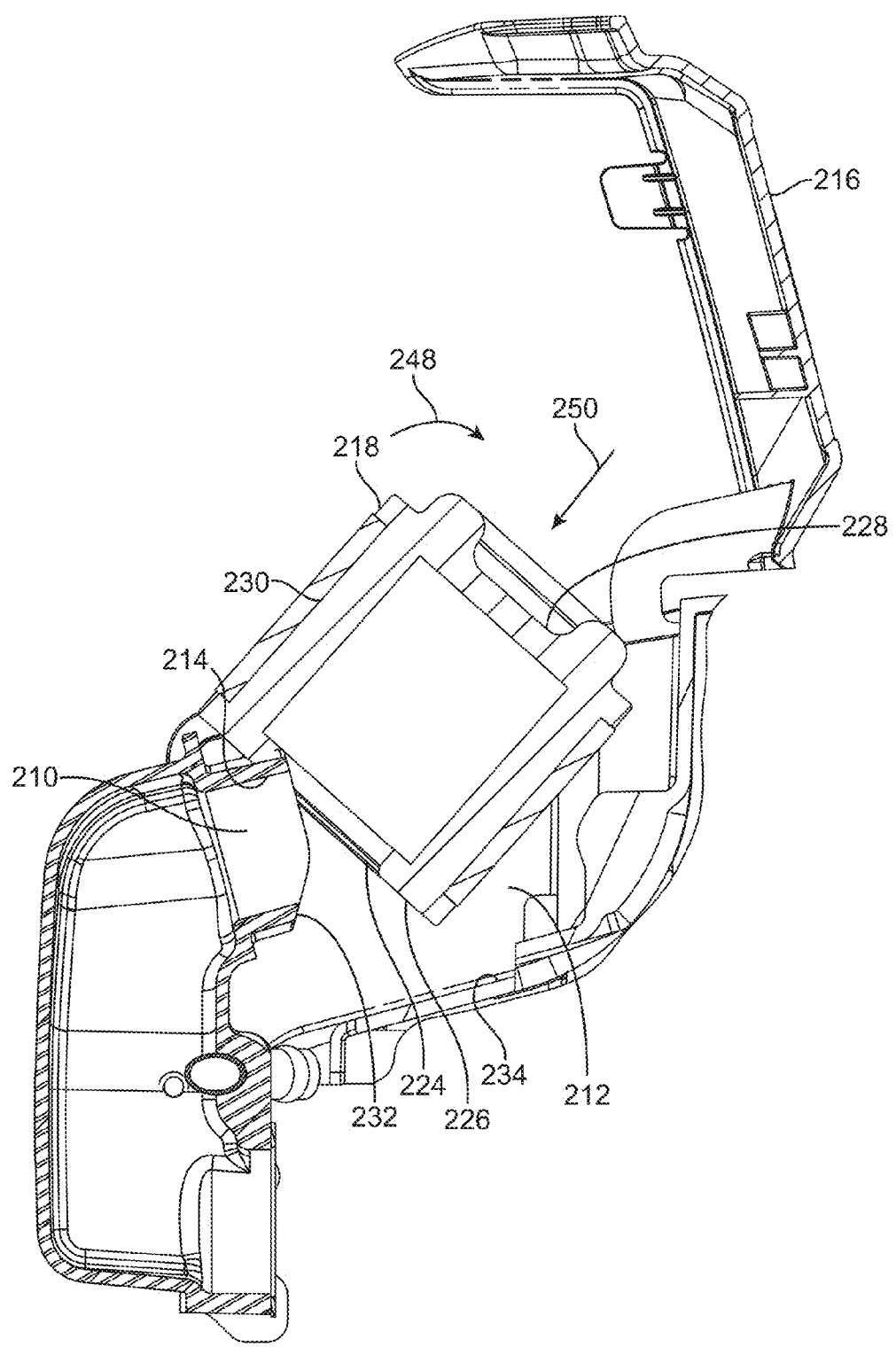
FIG. 11 is a partial section view similar to FIG. 9, but with the air cleaner door open and the air cleaner cartridge shown during installation.
Figure 12:
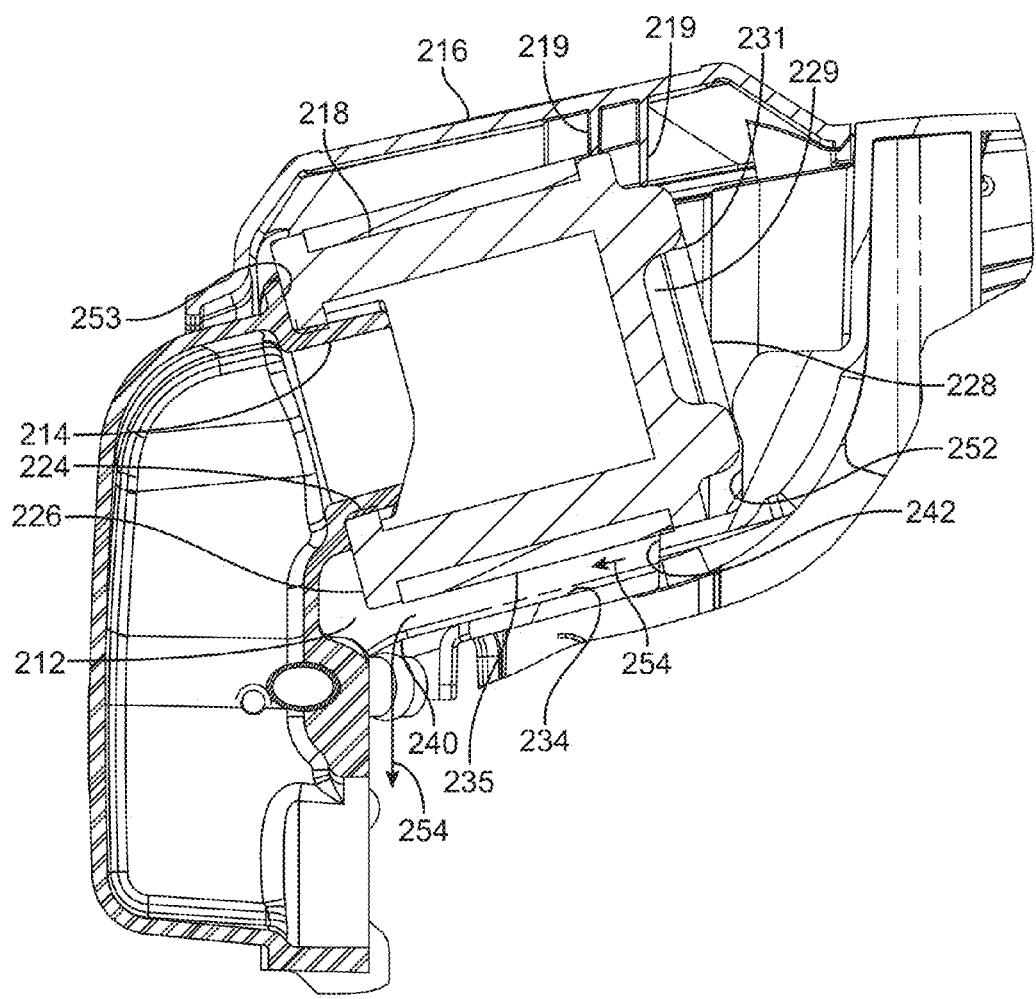
FIG. 12 is a partial section view similar to FIG. 11, but with the air cleaner cartridge fully installed (e.g., in the installed position) and the air cleaner door closed.

FIG. 11 illustrates an exemplary method of attaching the air cleaner cartridge 218 to the feed ports 214. As shown in this view, the air cleaner cartridge 218 may, with the door 216 open, be inserted into the compartment 212 at an angle as shown. For example, the air cleaner cartridge 218 may be positioned such that an upper portion of each aperture 224 rests upon a corresponding upper surface of its respective feed port 214. The air cleaner cartridge 218 may then be rotated (e.g., in the direction 248 of FIG. 11) and translated (e.g., in the direction 250) simultaneously (or in alternating fashion) until the air cleaner cartridge 218 reaches its installed position as shown in FIG. 12. A fixed retention surface 252 formed within the air cleaner compartment 212 (e.g., formed proximate the lower surface 234) may be adapted to engage or abut the air cleaner cartridge 218 (e.g., engage the second endcap 228 of the air cleaner cartridge) when the latter is in the installed position (i.e., when the air feed port(s) are fully engaged with the aperture(s)). In one embodiment, the endcaps 226 and 228 of the air cleaner cartridge 218 may be deformable such that the cartridge is slightly compressed between: flanges 253 of the air feed ports 214; and the retention surface 252 as indicated in FIG. 12.

In one embodiment, one or both of the door 216 and the air cleaner cartridge 218 includes a portion adapted to interfere with the door reaching the closed position of FIG. 12 (when the air cleaner cartridge in the air cleaner compartment) unless the air cleaner cartridge is in the installed position. That is, the door 216 may not close completely unless the cartridge 218 is correctly installed. For example, in the embodiment illustrated in FIG. 12, an inner facing surface of the door 216 may include one or more (e.g., two) ribs 219. Unless the cartridge 218 is correctly seated within the compartment as shown in FIG. 12, the ribs 219 will contact the air cleaner cartridge 218 before the door 216 is fully closed. In one embodiment, the ribs 219 may also contact the cartridge to assist with securing the cartridge 218 in place once the door 216 is closed.

Once the air cleaner cartridge 218 is located in the installed position within the air cleaner compartment 212 and the door 216 is closed as shown in FIG. 12, a volume of air may be provided to the compartment 212 through the air feed opening(s) 242. Once again, a first portion of the volume of air may pass through the air cleaner cartridge 218 for combustion by the engine, and a remaining or second portion of the volume of air passes over the lower surface 234 and exhausts or exits the air cleaner compartment 212 through the air exit opening 240 as indicated by the flow arrows 254 in FIG. 12. Moreover, debris contained within the air cleaner compartment 212 may become entrained in the second portion of the volume of air before it exits the compartment 212. In one embodiment of the engine, a lowermost portion 235 of the air cleaner cartridge may be spaced-apart from the lower surface 234 of the air cleaner compartment 212 when the air cleaner cartridge is in the installed position as shown in FIG. 12 to allow for less obstructed air flow over the lower surface.

To assist the operator with air cleaner cartridge 218 removal, the front or second endcap 228 of the cartridge may provide a gripping portion that, in one embodiment, is formed by an external (e.g., external-facing) recessed area 229 as shown in FIG. 12 (see also, for example, FIG. 5). The recessed area 229 may selectively receive one or more fingers of the operator's hand, whereby the finger(s) may be used to pull upwardly against a portion of the cartridge 218 (e.g., against a peripheral lip 231 defining the recessed area) to lift and remove the cartridge from the compartment 212. While the gripping portion is illustrated as a recessed area 229, other embodiments may provide other gripping portion configurations, e.g., the gripping portion could be an element (e.g., a nub or tab) that protrudes outwardly from the air cleaner cartridge 218. In fact, most any configuration that provides a gripping/leveraging surface that can assist with cartridge 218 removal is contemplated.

As one can appreciate, the process for changing the air cleaner cartridge 218 is quick and straightforward, requiring no tools or removal of separate fasteners or components that could be misplaced and/or lost. Moreover, embodiments like those described above may reduce the potential for debris to enter the air intakes during air cleaner cartridge replacement.

The engine 200 may include other features that simplify maintenance procedures. For example, FIGS. 13-16 illustrate an exemplary oil drain system 300 that may avoid perceived problems with conventional oil draining techniques.

Figure 13:
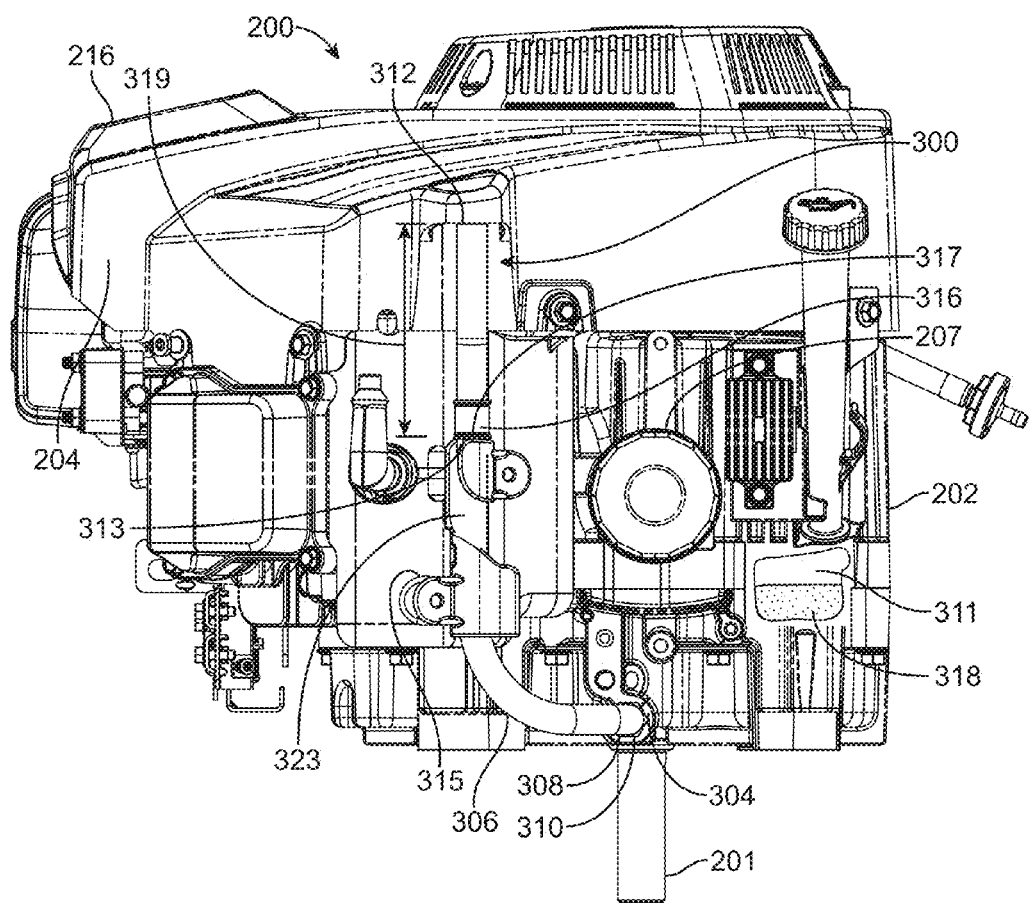
FIG. 13 is a side elevation view of the exemplary engine of FIG. 2 showing an oil drain tube in accordance with one embodiment, the drain tube shown in a stored position.

FIG. 13 illustrates a side view of the engine 200 (e.g., engine housing) showing the exemplary oil drain system 300. As described above, the engine housing may be attached to, or otherwise be supported by, structure, e.g., the chassis 102 or other vehicle structure (see FIG. 1). As shown in FIG. 13, the engine housing (e.g., the engine block 202) may define a reservoir 311 (see cut-away) adapted to hold a volume of oil 318. A base of the engine may define an external drain port 304 located at or near a lowermost elevation of the reservoir 311. The drain port 304 may be in fluid communication with the reservoir such that oil contained within the reservoir may be drained via an opening formed by the drain port.

A flexible drain tube 306 may also be provided, wherein a first or proximal end 308 of the drain tube is fixedly attached or connected to the drain port 304. For example, the drain port 304 may form a male nipple which receives the female proximal end 308 of the drain tube with an interference fit. A hose clamp 310 or similar retention device may be used to secure the proximal end 308 to the drain port in such a way that the drain tube remains connected to the drain port during normal vehicle operation and maintenance. That is, the proximal end 308 is intended to remain fixed or permanently connected to the drain port (of course, the drain tube may be removed from the drain port in some instances, e.g., for drain tube replacement or extensive engine maintenance/repair).

Figure 14:
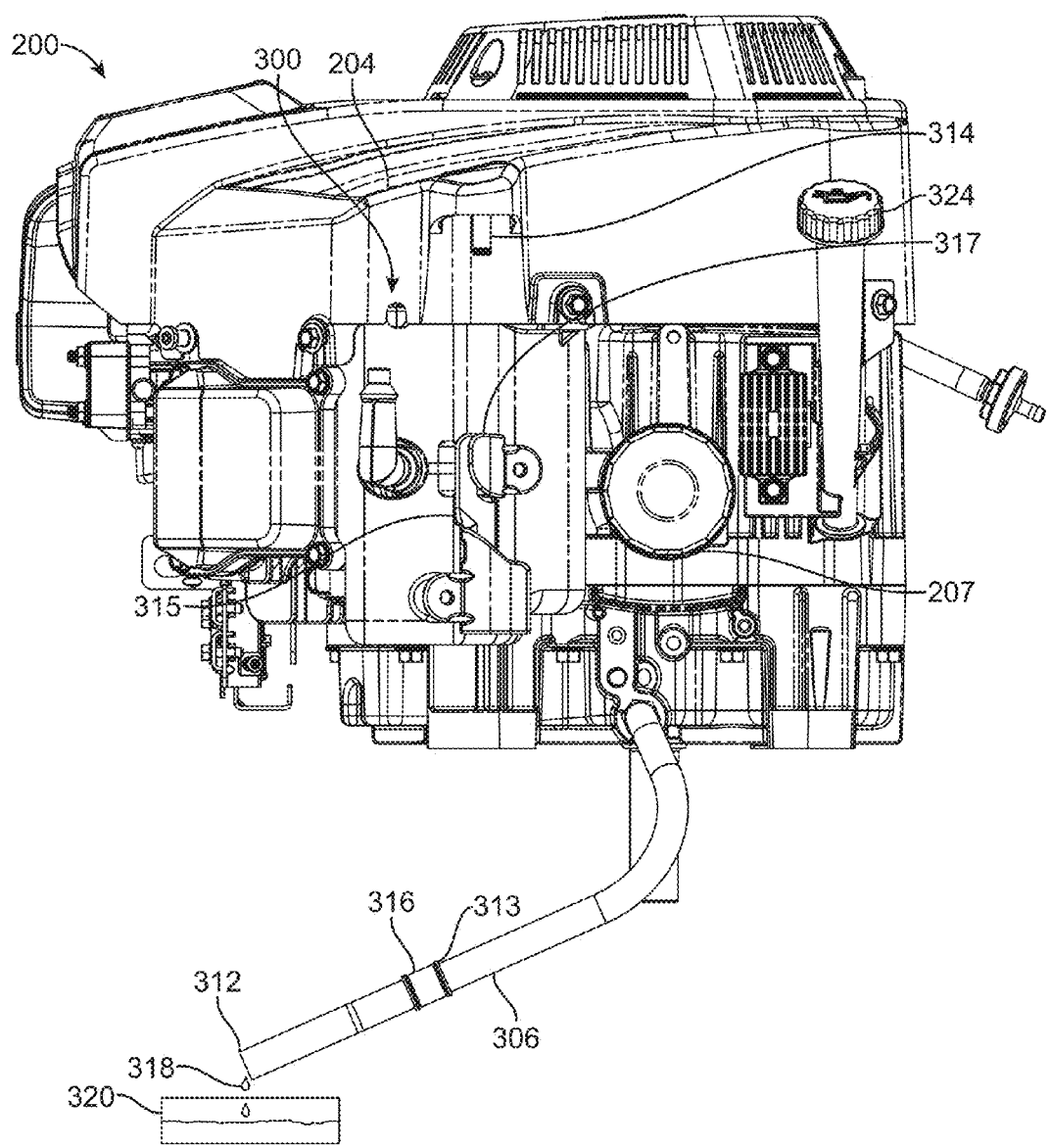
FIG. 14 is a side elevation view similar to FIG. 13, but with the drain tube shown in a drain position.

The drain tube 306 may be constructed of a rubber material (e.g., GREENbar 700 Series fuel hose available from Avon Automotive of Cadillac, Mich., USA) that can withstand the intended usage, (e.g., withstand exposure to heat, ultra-violet light, and oil). The rubber material may also permit the drain tube to be resiliently deflected when moved from a drain position (see FIG. 14) to a stored position (wherein the tube (or portion thereof) is oriented generally vertically as shown in FIG. 13). In the stored position, a distal end 312 of the drain tube 306 may be adapted to receive therein (e.g., connect to) a nipple 314 that is fixed in space. For example, the nipple 314 may be operatively connected to or formed on the engine housing (e.g., formed on the shroud 204) as shown in FIG. 14. Alternatively, the nipple 314 could be operatively connected to (e.g., mounted or formed on) structure such as the chassis 102 (see FIG. 1) or any other surrounding structure of the vehicle. In one embodiment, the distal end 312 could receive the nipple with sufficient interference (e.g., with an interference fit) so that the distal end remains attached to the nipple 314, even during subsequent mower operation. In another embodiment, a hose clamp could be provided to compress the drain tube 306 against the nipple 314. Such a hose clamp could be adapted to release when subjected to a squeezing force provided by the operator, i.e., the hose clamp may not require tools (such as pliers) to release.

In yet another embodiment, the drain tube 306 may have an enlarged diameter portion that is spaced-apart from the distal end 312. In one embodiment of the drain tube 306, the enlarged diameter portion is formed by a crimp ring 316 or similar device attached to the drain tube itself. Such a crimp ring 316 may be attached to the drain tube 306, e.g., with a crimping tool (not shown), such that a contact surface 313 formed by the crimp ring rests against an abutment surface 317 of a retention member 315 when the drain tube is in the stored position (see FIG. 13), i.e., the retention member may, along with the crimp ring, assist in retaining the drain tube in the stored position.

In one embodiment, the retention member 315 may be affixed to the engine housing (or other structure) at a location spaced-apart from the nipple, e.g., such that it is located between the proximal and distal ends of the drain tube 306 when the drain tube is in the stored position of FIG. 13. Accordingly, the crimp ring 316 may be located along the drain tube 306 such that the lower contact surface 313 is offset from the distal end 312 by a distance 319 (see FIG. 13). As further described below, the retention member 315 (e.g., the interaction of the lower contact surface 313 of the crimp ring 316 with the abutment surface 317 of the retention member) may assist in retaining the drain tube (e.g., distal end 312 of the drain tube) in the stored position (e.g., assist in maintaining the distal end relative to the nipple 314).

Figures 15, 16:
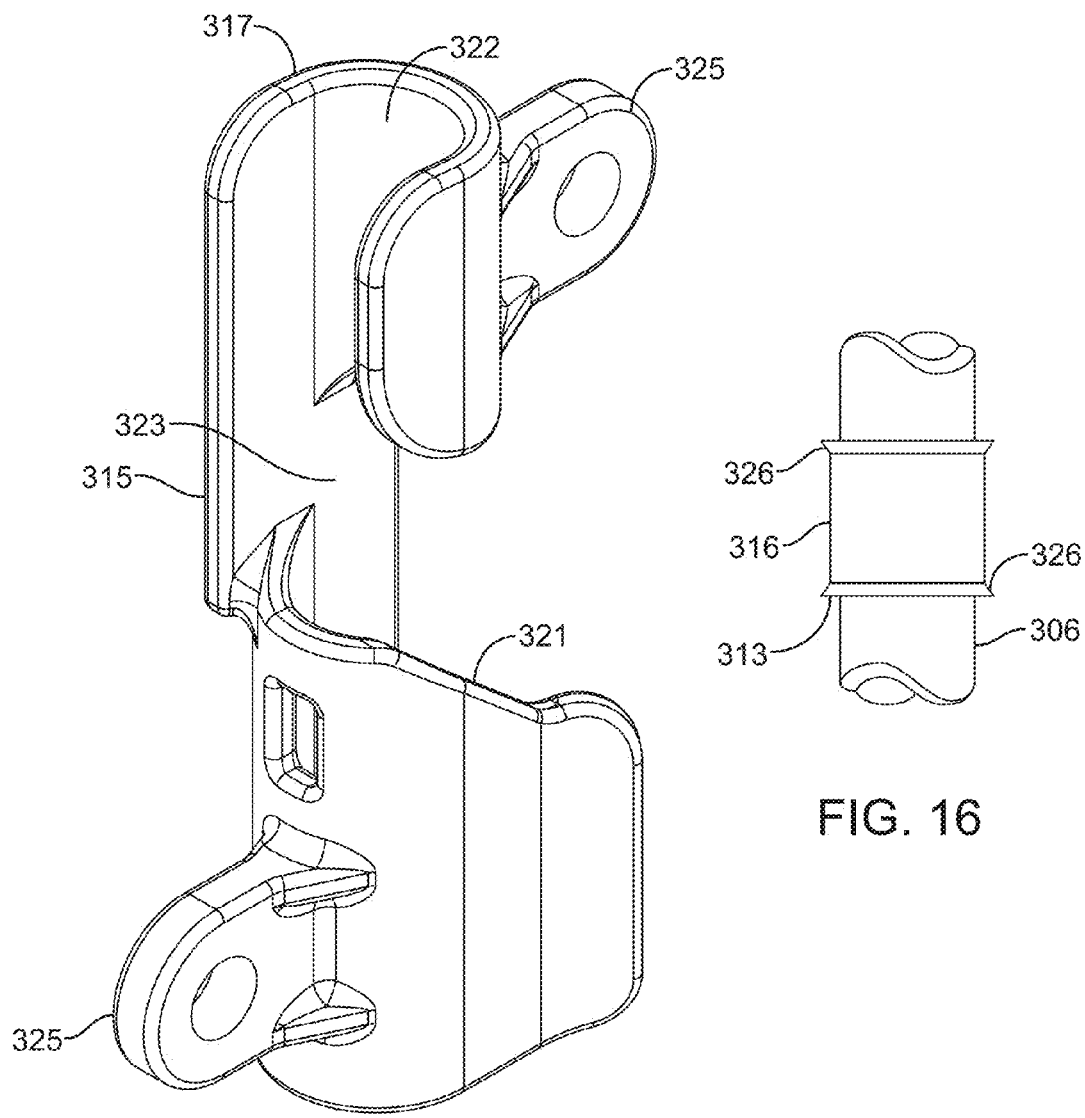
FIG. 15 is a perspective view of a retention member in accordance with one embodiment of the disclosure that may be used to assist in securing the drain tube in the stored position.
FIG. 16 is a side view of a portion of the drain tube in accordance with one embodiment of the disclosure.

FIG. 15 illustrates the retention member 315 in accordance with one embodiment. As illustrated in this view, the retention member 315 may include one or more hose receiving portions, e.g., lower receiving portion 321 and upper receiving portion 322. In the illustrated embodiment, each receiving portion 321, 322 may form a semi-cylindrical receptacle adapted to receive the hose (e.g., with clearance) and limit the ability of the hose to move in a transverse direction. As shown in FIG. 15, the two receiving portions 321, 322 may open in opposite directions from one another, wherein a passage 323 exists between the two receiving portions to permit simplified routing of the drain tube as further described below. In the illustrated embodiment, the retention member 315 may also define or include one or more lugs 325 adapted to permit fastening (e.g., bolting) or otherwise fixing the retention member to the engine housing (e.g., block 202).

When the distal end 312 of the drain tube 306 is attached to the nipple 314 as shown in FIG. 13, the distal end (and accordingly the nipple 314) may be at an elevation that is above an elevation or level of the oil 318 within the reservoir 311. As a result, oil may not flow out the distal end 312, e.g., even immediately upon disconnection of the tube from the nipple 314. In other embodiments, however, the distal end 312 may be at or even below the level of oil when in the stored position.

To assist with maintaining the distal end 312 of the drain tube in the stored position shown in FIG. 13, the lower contact surface 313 of the crimp ring 316 may, as described above, be in contact with the abutment surface 317 of the retention member 315 (when the drain tube is in the stored position). To increase the effective diameter of the crimp ring, it may be crimped with a tool that is narrower than the crimp ring itself. As a result, the crimp ring may form a bell shape 326, at least near the lower contact surface 313, as shown in FIG. 16. Other embodiments may provide the desired diameter of the lower contact surface 313 in most any acceptable manner (e.g., by using a larger diameter crimp ring).

When it is time to drain oil from the engine 200, the engine may be stopped and the distal end 312 of the drain tube may be separated from the nipple 314, after which the distal end 312 may be moved from the stored position of FIG. 13 to a drain position, wherein the distal end is at or below the lowermost elevation of the reservoir (e.g., at or below the drain port) as shown in FIG. 14. In one embodiment, this action may be achieved by sliding the drain tube 306 out of the upper receiving portion 322 of the retention member 315 (e.g., to the left in FIG. 13). The distal end 312 may (simultaneously or subsequently) then be manually pulled away from the nipple 314. Once separated from the nipple 314, the drain tube 306 may be bent until it can pass through the passage 323 (see FIG. 15), after which the drain tube may be slid out of the lower receiving portion 321. The drain tube 306 may then be movable to the drain position shown in FIG. 14. In the drain position, oil may flow from the distal end 312 once the distal end is placed at a location below the level of the oil within the reservoir 311. As shown in FIG. 14, the used oil 318 may flow from the reservoir through the drain tube 306, where it may be collected in an acceptable container 320.

Once the used oil 318 is drained from the engine 200, the drain tube 306 may be lifted and laid across the retention member 315 diagonally within the passage 323. The distal end 312 of the drain tube 306 may then be reattached to the nipple 314 as shown in FIG. 13, after which the tube 306 may be tucked into the lower receiving portion 321 and the upper receiving portion 322. Optionally, an oil filter 207 may also be changed at this time. An appropriate volume of new motor oil may then be added to the engine, e.g., via a fill tube 324 (see, e.g., FIG. 14). After checking the oil level and capping the fill tube 324, the engine may be started and mower operation resumed.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An internal combustion engine comprising:
a shroud defining an air cleaner compartment comprising a lower surface;
a door attached to the shroud, the door movable between a closed position enclosing the air cleaner compartment, and an open position providing access to the air cleaner compartment;
a tubular air feed port defining a combustion air intake of the engine, the air feed port terminating at an end face located at or within the air cleaner compartment, wherein a lower portion of the end face is notched relative to other portions of the end face; and
an air cleaner cartridge adapted to be received within the air cleaner compartment, the air cleaner cartridge comprising an exterior surface and an interior surface, the interior surface defined by an aperture extending through at least one wall of the air cleaner cartridge, the aperture adapted to engage the air feed port when the air cleaner cartridge is positioned in the air cleaner compartment in an installed position.

2. The engine of claim 1, wherein the lower surface is tilted or otherwise declined from horizontal toward an air exit opening.

3. The engine of claim 1, wherein a lowermost portion of the air cleaner cartridge is spaced-apart from the lower surface of the air cleaner compartment when the air cleaner cartridge is in the installed position.

4. The engine of claim 1, wherein the air cleaner cartridge has a cross section that is obround in shape.

5. The engine of claim 1, further comprising a fixed retention surface formed within the air cleaner compartment, the retention surface adapted to abut the air cleaner cartridge when the air feed port is fully engaged with the aperture.

6. The engine of claim 1, wherein one or both of the door and the air cleaner cartridge includes a portion that is adapted to interfere with the door reaching the closed position, when the air cleaner cartridge in the air cleaner compartment, unless the air cleaner cartridge is in the installed position.

7. The engine of claim 1, wherein the aperture engages the air feed port with an interference fit when the air cleaner cartridge is in the installed position.

8. The engine of claim 1, wherein an axis of the air feed port declines at an angle of 45 degrees or less from horizontal.

9. The engine of claim 8, wherein the axis of the air feed port is parallel to a plane containing the lower surface of the air cleaner compartment.

10. The engine of claim 9, wherein the shroud defines an air feed opening in communication with the air cleaner compartment, the air feed opening adapted to introduce air into the air cleaner compartment.

11. The engine of claim 10, wherein a portion of the air introduced into the air cleaner compartment passes over the lower surface and exits the air cleaner compartment through an air exit opening adjacent the lower surface.

12. An internal combustion engine comprising:
a shroud defining an air cleaner compartment including a lower surface;
a door pivotally attached to the shroud, the door pivotable between a closed position enclosing the air cleaner compartment, and an open position providing access to the air cleaner compartment;
two air feed ports each defining an air intake adapted to deliver combustion air to a carburetor of the engine, the air feed ports each terminating at an end face positioned in communication with the air cleaner compartment, wherein a lower portion of each end face is recessed relative to other portions of the respective end face; and
an air cleaner cartridge adapted to be received within the air cleaner compartment, the air cleaner cartridge comprising an exterior surface and interior surfaces, the interior surfaces defined by apertures extending through at least one wall of the air cleaner cartridge, the apertures adapted to engage the respective air feed ports when the air cleaner cartridge is positioned in the air cleaner compartment in an installed position.

13. The engine of claim 12, wherein the air cleaner cartridge comprises an endcap defining an external, recessed area.

14. The engine of claim 12, wherein one or more surfaces of the air cleaner compartment defines an air exit opening at or near the lower surface, and wherein the lower surface is tilted or otherwise declined toward the air exit opening.

15. The engine of claim 14, wherein the one or more surfaces of the air cleaner compartment also defines an air feed opening, the air feed opening adapted to provide air flow into the air cleaner compartment.

16. The engine of claim 15, wherein a portion of the air flow provided into the air cleaner compartment exits the air cleaner compartment through the air exit opening.

17. The engine of claim 12, wherein the air cleaner cartridge defines a cross section that is obround in shape, the air cleaner cartridge bounded by a first and second endcap, wherein the apertures are formed in the first endcap.

18. The engine of claim 12, wherein the lower surface of the air cleaner compartment is spaced-apart from a lowermost portion of the air cleaner cartridge when the air cleaner cartridge is in the installed position.

19. The engine of claim 12, wherein at least one of the air feed ports defines an axis, and wherein the axis is parallel to a plane containing the lower surface of the air cleaner compartment.

20. The engine of claim 12, wherein one or both of the door and the air cleaner cartridge include a portion that is adapted to interfere with the door reaching the closed position when the air cleaner cartridge is in the air cleaner compartment, unless the air cleaner cartridge is in the installed position.

21. An internal combustion engine comprising:
a shroud defining an air cleaner compartment comprising a lower surface, the air cleaner compartment comprising an air feed opening and an air exit opening, the air exit opening located at or near the lower surface;
a door attached to the shroud, the door movable between a closed position enclosing the air cleaner compartment, and an open position providing access to the air cleaner compartment;
a tubular air feed port defining a combustion air intake of the engine, the air feed port terminating at an end face located at or within the air cleaner compartment; and
an air cleaner cartridge adapted to be received within the air cleaner compartment, the cartridge comprising an exterior surface and an interior surface, the interior surface defined by an aperture extending through at least one wall of the air cleaner cartridge, the aperture adapted to engage the air feed port when the air cleaner cartridge is positioned in the air cleaner compartment in an installed position.

22. The engine of claim 21, wherein the air exit opening is adapted to exhaust air in excess of that needed for combustion from the air cleaner compartment.

23. The engine of claim 21, wherein the engine further comprises a fan adapted to introduce air into the air cleaner compartment via the air feed opening.

24. The engine of claim 21, wherein the air feed opening comprises two or more air feed openings.

* * * * *

UNITED STATES PATENT AND TRADEMARK OFFICE
CERTIFICATE OF CORRECTION

| | | |
|---|---|---|
| PATENT NO. | : 9,719,468 B2 | Page 1 of 1 |
| APPLICATION NO. | : 14/730625 | |
| DATED | : August 1, 2017 | |
| INVENTOR(S) | : Kakuk et al. | |

It is certified that error appears in the above-identified patent and that said Letters Patent is hereby corrected as shown below:

In the Specification

Column 12, Line 16, "cartridge in the air" should be changed to --cartridge is in the air--.

In the Claims

Column 16, Line 4, "cartridge in the air" should be changed to --cartridge is in the air--.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*